(12) United States Patent
Kobayashi

(10) Patent No.: US 10,139,308 B2
(45) Date of Patent: Nov. 27, 2018

(54) PHYSICAL QUANTITY DETECTION APPARATUS, MEASUREMENT SYSTEM, AND MEASUREMENT APPARATUS

(71) Applicant: Seiko Epson Corporation, Tokyo (JP)

(72) Inventor: Yoshihiro Kobayashi, Komagane (JP)

(73) Assignee: Seiko Epson Corporation (JP)

( * ) Notice: Subject to any disclaimer, the term of this patent is extended or adjusted under 35 U.S.C. 154(b) by 155 days.

(21) Appl. No.: 15/384,666

(22) Filed: Dec. 20, 2016

(65) Prior Publication Data

US 2017/0184471 A1   Jun. 29, 2017

(30) Foreign Application Priority Data

Dec. 28, 2015  (JP) ................................. 2015-256338

(51) Int. Cl.
*G01M 5/00* (2006.01)

(52) U.S. Cl.
CPC ........ *G01M 5/0066* (2013.01); *G01M 5/0008* (2013.01)

(58) Field of Classification Search
CPC .......................... G01M 5/0066; G01M 5/0008
USPC .... 73/570, 579–583, 652, 654, 662, 862.59, 73/862.41, 768
See application file for complete search history.

(56) References Cited

U.S. PATENT DOCUMENTS

| | | | | |
|---|---|---|---|---|
| 4,751,849 A | * | 6/1988 | Paros | ....................... G01G 3/16 73/778 |
| 5,020,370 A | * | 6/1991 | Deval | ..................... G01L 1/162 310/321 |
| 5,113,698 A | * | 5/1992 | Grlj | ......................... G01L 1/162 73/514.15 |
| 2002/0092359 A1 | * | 7/2002 | Lange | .................... B82Y 35/00 73/779 |
| 2005/0160816 A1 | * | 7/2005 | Yu | ........................... B81C 3/002 73/514.29 |
| 2008/0087083 A1 | * | 4/2008 | Nishizawa | ........... G01P 15/097 73/514.29 |
| 2011/0174075 A1 | * | 7/2011 | Watanabe | ............... G01P 15/09 73/514.34 |
| 2012/0067124 A1 | * | 3/2012 | Zolfagharkhani | . G01C 19/5733 73/579 |
| 2012/0227274 A1 | * | 9/2012 | Watanabe | ................ G01C 9/06 33/365 |
| 2012/0304769 A1 | * | 12/2012 | Watanabe | .......... G01P 15/0802 73/514.01 |
| 2013/0104677 A1 | * | 5/2013 | Watanabe | ................ G01C 9/06 73/865.8 |

(Continued)

FOREIGN PATENT DOCUMENTS

| | | |
|---|---|---|
| JP | 2005-030786 A | 2/2005 |
| JP | 2017-120208 A | 7/2017 |

*Primary Examiner* — Jonathan Dunlap
(74) *Attorney, Agent, or Firm* — Harness, Dickey & Pierce, P.L.C.

(57) ABSTRACT

A detecting element unit of a physical quantity detection apparatus includes a detection part and a supporting part. The detection part has a base part, a movable part coupled to the base part via a joint part, and a vibrator provided over the base part and the movable part, and the supporting part includes a fixing portion to be fixed to a base for supporting the base part. A processing unit of the physical quantity detection apparatus extracts vibration response signals at a resonance frequency of the detecting element unit from output of the vibrator.

8 Claims, 9 Drawing Sheets

(56) References Cited

U.S. PATENT DOCUMENTS

| | | | | |
|---|---|---|---|---|
| 2013/0112019 A1* | 5/2013 | Watanabe | ............ | G01P 15/097 73/865.8 |
| 2013/0167669 A1* | 7/2013 | Watanabe | ............... | G01P 15/09 73/865 |
| 2013/0263661 A1* | 10/2013 | Watanabe | ............... | G01P 1/023 73/504.12 |
| 2014/0202260 A1* | 7/2014 | Nakamura | ............ | B81B 3/0021 73/862.59 |
| 2016/0079954 A1* | 3/2016 | Kameta | ................... | H03H 9/17 310/321 |
| 2017/0184550 A1 | 6/2017 | Kobayashi | | |

\* cited by examiner

PHYSICAL QUANTITY DETECTION APPARATUS, MEASUREMENT SYSTEM, AND MEASUREMENT APPARATUS

BACKGROUND

1. Technical Field

The present invention relates to a physical quantity detection apparatus, a measurement system, and a measurement apparatus.

2. Related Art

Patent Document 1 (JP-A-2005-30786) describes, in weight measuring means for bridge passing vehicles, a plurality of speed detection sensors are provided along a traveling route to detect the traveling speeds of the passing vehicles, an axle detection sensor is provided in the traveling route to detect axle positions and the number of axles of the passing vehicles, vehicle recognition of the passing vehicles is performed using the traveling speeds and the axle positions, deformation amount measuring means is provided in a bridge to measure a deformation amount of the bridge at a plurality of times within a preset measurement period in correspondence with axles of the vehicle-recognized passing vehicles, and weights of the passing vehicles are calculated based on vehicle recognition data and measurement data of the deformation amounts in correspondence with the axles.

Now, it is important to obtain attenuation characteristics including an attenuation coefficient of a structure such as a floor slab for checking a condition of the structure. Accordingly, it is desired that signals suitable for calculation of the attenuation characteristics of the structure are output from an acceleration sensor.

Note that Patent Document 1 discloses the detection of the axle positions and the number of axles of the vehicles, however, does not disclose output of signals including frequencies suitable for calculation of the attenuation characteristics of the structure.

SUMMARY

An advantage of some aspects of the invention is to output signals suitable for calculation of attenuation characteristics of a structure.

A first aspect of the invention is directed to a physical quantity detection apparatus including a detecting element unit having a detection part having a base part, a movable part coupled to the base part via a joint part, and a vibrator provided over the base part and the movable part, and a supporting part including a fixing portion to be fixed to a base for supporting the base part, and a processing unit that extracts vibration response signals at a resonance frequency of the detecting element unit from output of the vibrator. According to the first aspect, the physical quantity detection apparatus extracts the vibration response signals at the resonance frequency of the detecting element unit, and thereby, may output signals suitable for calculation of attenuation characteristics of a structure from the extracted vibration response signals.

The processing unit may output amplitude information of the vibration response signals. Thereby, the physical quantity detection apparatus may output the amplitude information of the vibration response signals suitable for calculation of attenuation characteristics of a structure.

The processing unit may calculate physical quantity signals from output of the vibrator. Thereby, the physical quantity detection apparatus may output the amplitude information and the physical quantity signals.

The processing unit may output one of the amplitude information and the physical quantity signals according to a command. Thereby, for example, the physical quantity detection apparatus may output one of the amplitude information and the physical quantity signals from a single output port, and may be downsized.

In the physical quantity signals, the resonance frequency of the detecting element unit may be suppressed or removed. Thereby, the physical quantity detection apparatus may output appropriate physical quantity signals in which the resonance frequency of the detecting element unit is suppressed or removed.

The amplitude information may be envelope signals. Thereby, the physical quantity detection apparatus may output the envelope signals suitable for calculation of attenuation characteristics of a structure.

A second aspect of the invention is directed to a measurement system including a physical quantity detection apparatus having a detecting element unit having a detection part having a base part, a movable part coupled to the base part via a joint part, and a vibrator provided over the base part and the movable part, and a supporting part including a fixing portion to be fixed to a base for supporting the base part, and a processing unit that extracts vibration response signals at a resonance frequency of the detecting element unit from output of the vibrator, and a measurement apparatus that calculates attenuation characteristics of a structure based on the vibration response signals extracted by the physical quantity detection apparatus. According to the second aspect, the physical quantity detection apparatus extracts the vibration response signals at the resonance frequency of the detecting element unit, and thereby, may output signals suitable for calculation of the attenuation characteristics of the structure from the extracted vibration response signals to the measurement apparatus.

A third aspect of the invention is directed to a measurement apparatus including a command output part that, to a physical quantity detection apparatus having a detecting element unit having a detection part having a base part, a movable part coupled to the base part via a joint part, and a vibrator provided over the base part and the movable part, and a supporting part including a fixing portion to be fixed to a base for supporting the base part, and a processing unit that extracts vibration response signals at a resonance frequency of the detecting element unit from output of the vibrator, outputs a command of instructing output one or both of amplitude information of the vibration response signals and physical quantity signals calculated from output of the vibrator. According to the third aspect, the measurement apparatus may designate and acquire one or both of the amplitude information and the physical quantity signals from the physical quantity detection apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained with reference to the drawings.

First Embodiment

Figure 1:
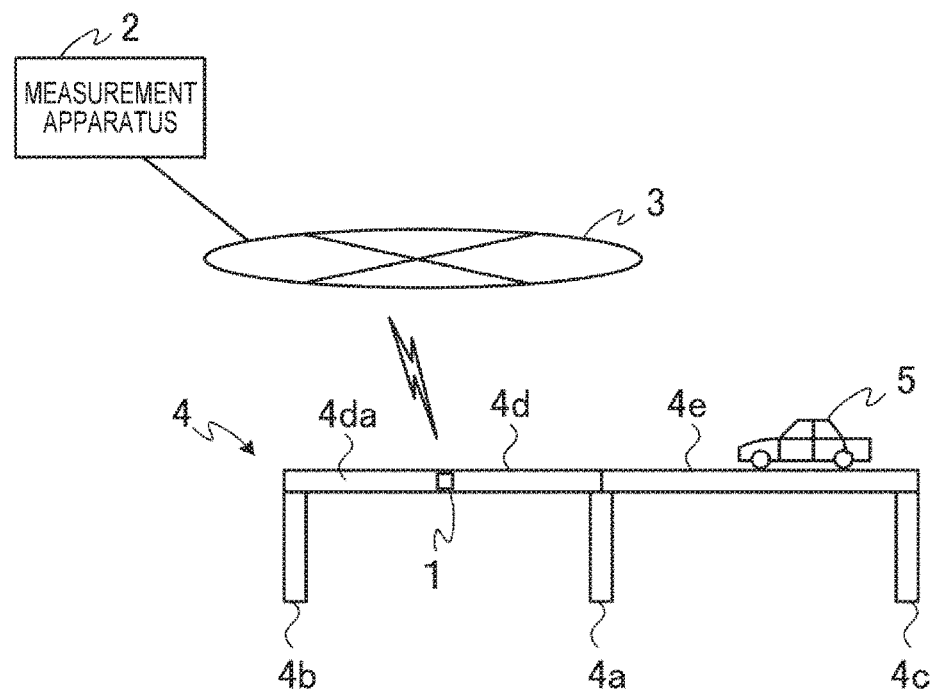
FIG. 1 shows a configuration example of a measurement system according to the first embodiment.

FIG. 1 shows a configuration example of a measurement system according to the first embodiment. As shown in FIG. 1, the measurement system has an acceleration sensor (corresponding to a physical quantity detection apparatus according to the invention) 1 and a measurement apparatus 2. Further, FIG. 1 shows a communication network 3 and a bridge 4.

The bridge 4 has a bridge pier 4a located nearly in the center part of the bridge 4, two abutments 4b, 4c located on both ends, a floor slab 4d built over from the abutment 4b to the bridge pier 4a, and a floor slab 4e built over from the abutment 4c to the bridge pier 4a. The bridge pier 4a and the abutments 4b, 4c are respectively fixed onto a foundation (not shown) provided on the ground.

The acceleration sensor 1 is provided on a side surface 4da of the floor slab 4d. Specifically, the acceleration sensor 1 is provided on the side surface 4da (end part) in parallel (including nearly in parallel) to a restriction direction of moving direction restricting means (e.g. lanes, curbs, parapets, etc.) for a vehicle 5 provided in the floor slab 4d in a center part (including a nearly center part) in the restriction direction.

The acceleration sensor 1 is communicably connected to the measurement apparatus 2 via the communication network 3. For example, the acceleration sensor 1 has a wireless communication interface or connected to a wireless communication interface and is connected to the communication network 3 via the wireless communication interface. The acceleration sensor 1 also includes an inertial sensor that outputs accelerations and angular velocities.

The acceleration sensor 1 has a plurality of output ports and outputs different signals from the respective output ports. The signals output from the acceleration sensor 1 are e.g. digital signals.

Figure 2A:
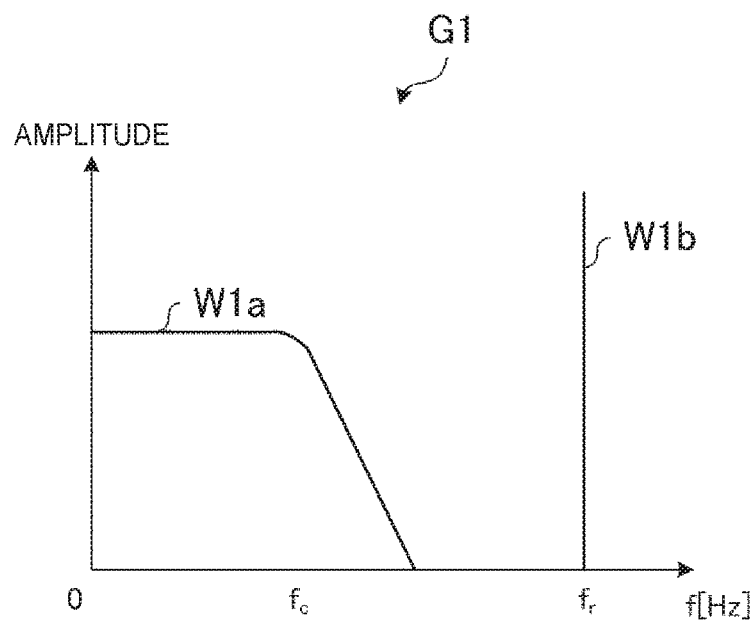
FIGS. 2A and 2B are diagrams for explanation of an output example of an acceleration sensor.
Figure 2B:
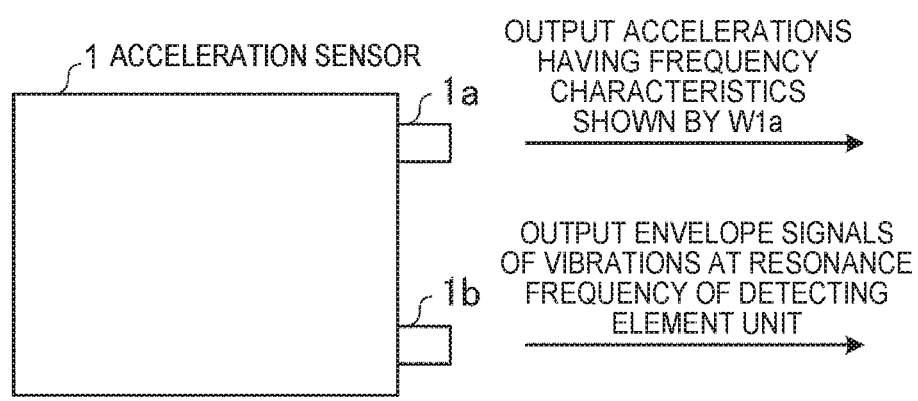

FIGS. 2A and 2B are diagrams for explanation of an output example of the acceleration sensor 1. FIG. 2A shows an example of frequency characteristics of the acceleration sensor 1. FIG. 2B shows an example of the output ports of the acceleration sensor 1. For example, as shown in FIG. 2B, the acceleration sensor 1 has two output ports 1a, 1b.

The acceleration sensor 1 has a movable part (for example, movable part 23 shown in FIGS. 4, 5, 6) to be displaced due to accelerations, which will be described later in detail. The acceleration sensor 1 calculates acceleration data (corresponding to physical quantity signals according to the invention) based on the displacement caused by the accelerations of the movable part.

A waveform W1a of a graph G1 shows a frequency characteristic of the acceleration data output by the acceleration sensor 1. The acceleration sensor 1 extracts and outputs an acceleration having a low-pass characteristic as shown by the waveform W1a of the acceleration data calculated based on the displacement of the movable part from the output port 1a. The cutoff frequency of the waveform W1a is e.g. "$f_c$". Hereinafter, the acceleration data calculated based on the displacement of the movable part may be simply referred to as "acceleration".

Figure 5:
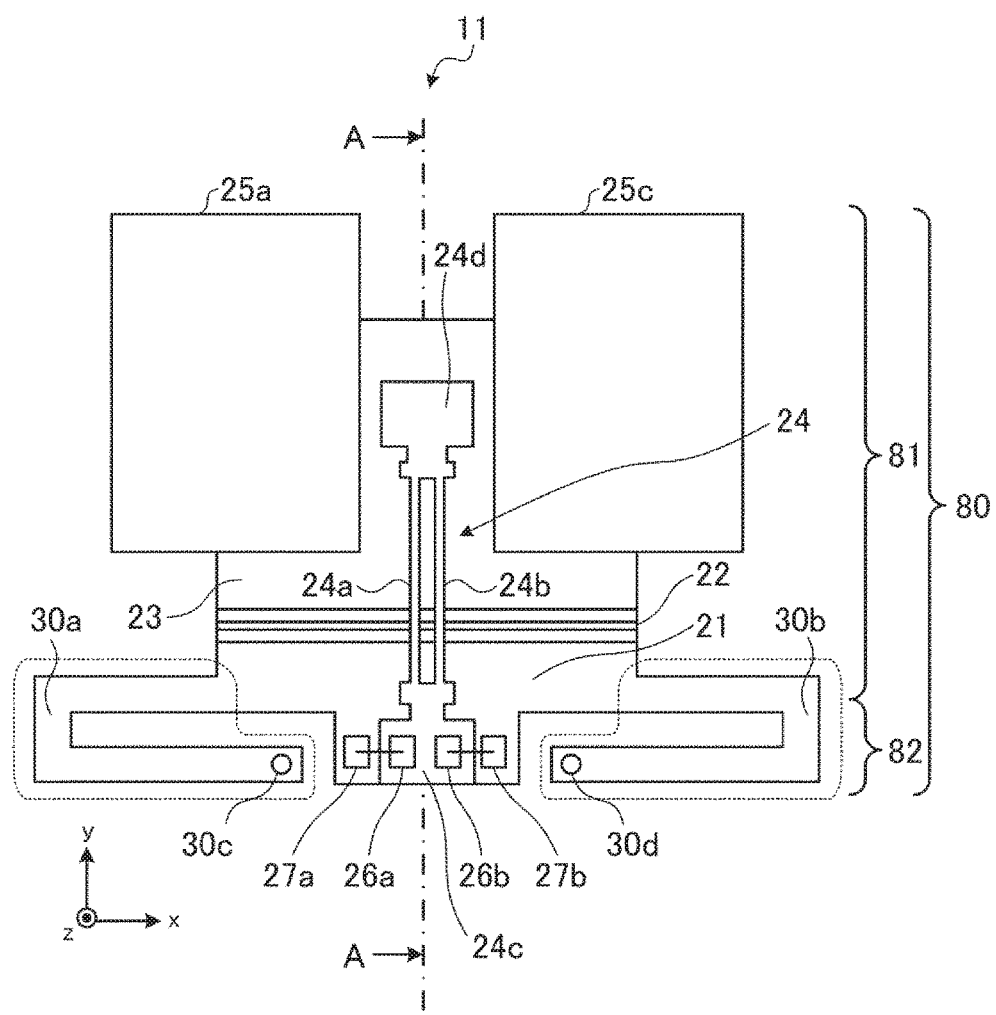
FIG. 5 is a plan view of the sensor unit in FIG. 4.

Further, the acceleration sensor 1 has a detecting element unit including a detection part and a supporting part (e.g., a detecting element unit 80 including a detection part 81 and a supporting part 82 shown in FIG. 5). The acceleration sensor 1 extracts signals of vibrations at the resonance frequency of the detecting element unit (corresponding to vibration response signals according to the invention), and outputs amplitude information of the extracted signals. The amplitude information is e.g. envelope signals of the extracted signals.

The waveform W1b of the graph G1 shows the resonance frequency "$f_r$" of the detecting element unit of the acceleration sensor 1. The resonance frequency "$f_r$" is larger than "$f_c$". The acceleration sensor 1 outputs envelope signals (amplitude changes) of the vibrations at the resonance frequency "$f_r$" of the detecting element unit from the output port 1b. Hereinafter, the envelope signals of the vibrations at the resonance frequency of the detecting element unit may be also referred to as "amplitude information in the resonance of the detecting element unit".

Note that a general acceleration sensor does not output the amplitude information in the resonance of the detecting element unit. For example, the general acceleration sensor does not include the output port 1b, and outputs an acceleration having the low-pass characteristic shown by the waveform W1a from the output port 1a.

Returning to FIG. 1, when the vehicle 5 travels (moves) on the floor slab 4d, the floor slab 4d bows downward due to the load of the vehicle 5. The measurement apparatus 2 analyzes the motion of the vehicle 5 on the floor slab 4d based on the accelerations due to the bowing of the floor slab 4d produced by the load of the vehicle 5. For example, the measurement apparatus 2 analyzes the lane and the velocity in and at which the vehicle 5 travels on the floor slab 4d.

The frequencies of the accelerations of the floor slab 4d due to the load of the vehicle 5 are contained in the frequency component shown by the waveform W1a in FIG. 2A. For example, the frequencies of the accelerations due to the load of the vehicle 5 are sufficiently lower than the cutoff frequency "$f_c$" shown by the waveform W1a depending on the velocity at which the vehicle 5 travels on the floor slab 4d and the length of the floor slab 4d, and contained in the frequency component shown by the waveform W1a in FIG. 2A. Therefore, the measurement apparatus 2 may analyze the motion of the vehicle 5 on the floor slab 4d from the accelerations in the frequency component of the waveform W1a output from the output port 1a of the acceleration sensor 1.

Further, when traveling on the floor slab 4d, the vehicle 5 travels while beating (making impacts on) the floor slab 4d with tires. The measurement apparatus 2 calculates the attenuation coefficient of the floor slab 4d based on the envelope (amplitude changes) of the vibrations of the floor slab 4d caused by the impacts of the vehicle 5.

The frequencies of the vibrations of the floor slab 4d due to the impacts of the vehicle 5 vary over a wide range (ideally, vary over all frequencies). Therefore, the vibrations (or accelerations) of the floor slab 4d due to the impacts of the vehicle 5 are contained in the frequency components shown by the wavelengths W1a, W1b in FIG. 2A. Accordingly, the measurement apparatus 2 may calculate the attenuation coefficient of the floor slab 4d from the amplitude information in the resonance of the detecting element unit output from the output port 1b of the acceleration sensor 1.

The measurement apparatus 2 does not calculate the attenuation coefficient of the floor slab 4d from the envelope of the accelerations in the frequency component of the waveform W1a because the frequency component in the waveform W1a contains acceleration components unnecessary for the calculation of the attenuation coefficient of the floor slab 4d. For example, the frequency component of the waveform W1a contains the above described frequency component of the accelerations due to the load of the vehicle 5. Further, the frequency component of the waveform W1a contains frequencies of accelerations due to natural resonance of the floor slab 4d (sufficiently lower than the cutoff frequency "$f_c$" depending on the material and the length of the floor slab 4d). The accelerations due to the load of the vehicle 5 and the accelerations due to the natural resonance of the floor slab 4d are noise in the calculation of the attenuation coefficient of the floor slab 4d different from the accelerations due to the impacts of the vehicle 5.

On the other hand, the resonance frequency "$f_r$" of the detecting element unit is set to be sufficiently higher than the frequencies of the accelerations (vibrations) due to the load of the vehicle 5 and the frequencies of the accelerations (vibrations) due to the natural resonance of the floor slab 4d. In other words, the resonance frequency of the detecting element unit does not contain the acceleration (vibration) components unnecessary for the calculation of the attenuation coefficient of the floor slab 4d. Accordingly, as described above, the measurement apparatus 2 calculates the attenuation coefficient of the floor slab 4d from the amplitude information in the resonance of the detecting element unit shown by the waveform W1b in FIG. 2A.

In this manner, the acceleration sensor 1 extracts the amplitude information in the resonance of the detecting element unit using the resonance frequency of the detecting element unit as a pickup frequency of the vibrations due to the impacts of the vehicle 5. That is, the acceleration sensor 1 extracts the amplitude information of the vibrations at the frequency suitable for the calculation of the attenuation coefficient of the floor slab 4d. Thereby, the acceleration sensor 1 may output a signal suitable for the calculation of the attenuation coefficient of the floor slab 4d.

Figure 3:
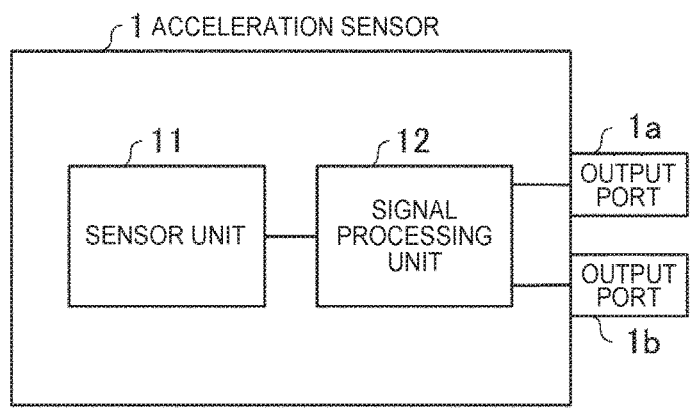
FIG. 3 shows a functional block example of the acceleration sensor.

FIG. 3 shows a configuration example of a functional block of the acceleration sensor 1. As shown in FIG. 3, the acceleration sensor 1 has a sensor unit 11 and a signal processing unit (corresponding to a processing unit according to the invention) 12. Further, in the acceleration sensor 1 of FIG. 3, the output ports 1a, 1b shown in FIG. 2B are shown. First, the sensor unit 11 will be explained using the drawings.

Figure 4:
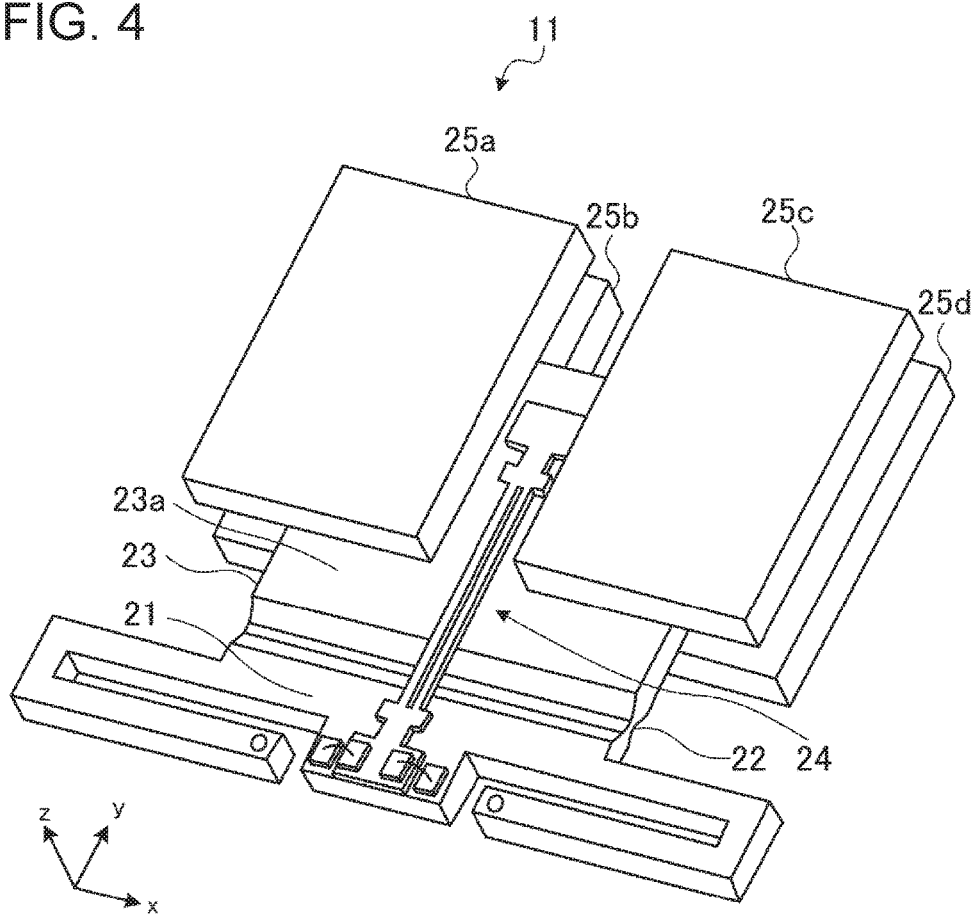
FIG. 4 is a perspective view schematically showing a sensor unit.

FIG. 4 is a perspective view schematically showing the sensor unit 11. As shown in FIG. 4, the sensor unit 11 has a base part 21, a joint part 22, a movable part 23, an acceleration detecting element 24 (corresponding to a vibrator according to the invention), and mass portions 25a to 25d.

The base part 21 supports the movable part 23 via the joint part 22.

The joint part 22 is provided between the base part 21 and the movable part 23. The joint part 22 has grooves for movement of the movable part 23 with respect to the base part 21. The joint part 22 is a rotation shaft along an x-axis as a fulcrum (intermediate hinge) when the movable part 23 moves (rotates) with respect to the base part 21.

The movable part 23 is supported by the base part 21 via the joint part 22. In the example of FIG. 4, the movable part 23 is extended along the y-axis from the base part 21 via the joint part 22.

The movable part 23 has a plate-like shape and has a surface 23a. The movable part 23 is displaceable (rotatable) in a direction crossing the surface 23a (z-axis direction) with the joint part 22 as the fulcrum (rotation shaft) according to the change of the acceleration applied to the direction crossing the surface 23a (z-axis direction).

The acceleration detecting element 24 is provided over the base part 21 and the movable part 23. The displacement of the movable part 23 due to the acceleration is detected by the acceleration detecting element 24.

The mass portions 25a to 25d are provided on the movable part 23. The mass portions 25a to 25d improve detection sensitivity of the acceleration applied to the movable part 23 by the weights thereof.

FIG. 5 is a plan view of the sensor unit 11 in FIG. 4. The component elements in FIG. 5 same as those in FIG. 4 have the same signs. Referring to FIG. 5, the detecting element unit 80, the acceleration detecting element 24, and electrodes 26a, 26b, 27a, 27b will be explained.

As shown in FIG. 5, the detecting element unit 80 has the detection part 81 and the supporting part 82. The detection part 81 has the base part 21, the movable part 23 coupled to the base part 21 via the joint part 22, and the acceleration detecting element 24 provided over the base part 21 and the movable part 23.

The supporting part 82 (parts shown by dotted frames) has bending portions 30a, 30b coupled to the base part 21 and fixing portions 30c, 30d. The fixing portions 30c, 30d are provided on the ends of the bending portions 30a, 30b. The fixing portions 30c, 30d are portions for fixing the sensor unit 11 to a member such as a package or circuit board. The supporting part 82 is fixed to the member such as a package or circuit board by the fixing portions 30c, 30d and supports the base part 21.

The acceleration detecting element 24 has vibration beam portions 24a, 24b and element base portions 24c, 24d. The vibration beam portions 24a, 24b extend from the element base portion 24c to the element base portion 24d in the extension direction of the movable part 23 (along the y-axis).

The shapes of the vibration beam portions 24a, 24b are e.g. rectangular columnar shapes. The vibration beam portions 24a, 24b flexurally vibrate away from or closer to each other along the x-axis when drive signals (alternating-current voltages) are applied to excitation electrodes (not shown) provided on the vibration beam portions 24a, 24b.

The acceleration detecting element 24 has the two vibration beam portions 24a, 24b and the pair of element base portions 24c, 24d. Accordingly, the acceleration detecting element 24 may be called a double tuning fork element (double tuning fork vibrator element).

For example, the acceleration detecting element 24 is formed by patterning of a quartz crystal board cut out at a predetermined angle from a gemstone of quartz crystal or the like using the photolithography technology and the etching technology. Thereby, the vibration beam portions 24a, 24b and the element base portions 24c, 24d may be integrally formed.

Note that the material for the acceleration detecting element 24 is not limited to the quartz crystal, but may be a piezoelectric material such as lithium tantalate ($LiTaO_3$), lithium tetraborate ($Li_2B_4O_7$), lithium niobate ($LiNbO_3$), lead zirconate titanate (PZT), zinc oxide (ZnO), or aluminum nitride (AlN) or a semiconductor material such as silicon coated with a piezoelectric material such as zinc oxide (ZnO) and aluminum nitride (AlN).

The electrodes 26a, 26b are provided on the element base portion 24c of the acceleration detecting element 24. The electrodes 26a, 26b are electrically connected to the excitation electrodes (not shown) provided on the vibration beam portions 24a, 24b.

The electrodes 27a, 27b are provided on the base part 21. The electrodes 27a, 27b are connected to the electrodes 26a, 26b by metal wires. The electrodes 27a, 27b are connected to the signal processing unit 12, which will be described later.

Figure 6:
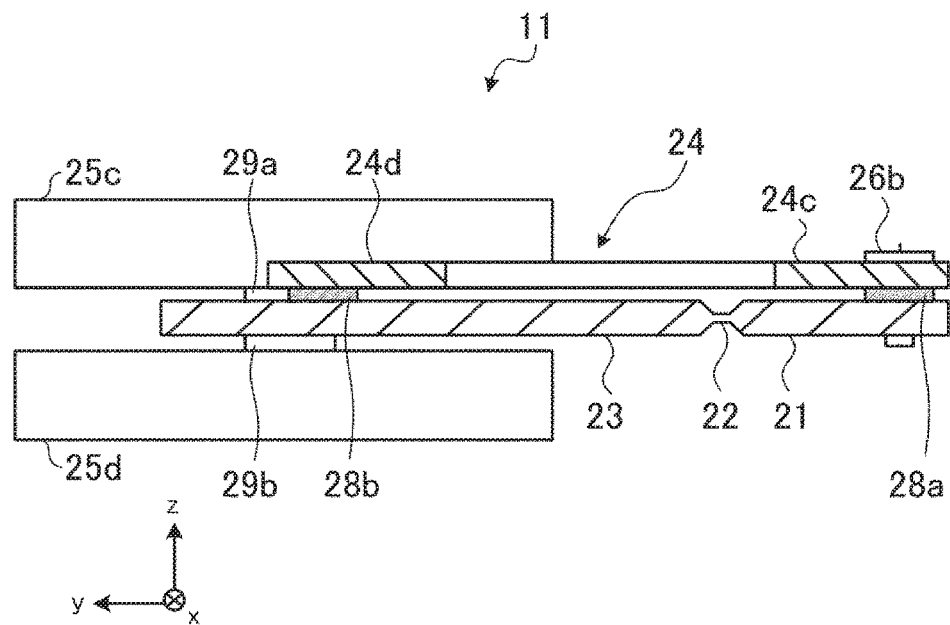
FIG. 6 shows the sensor unit as seen from a direction of arrows AA in FIG. 5.

FIG. 6 shows the sensor unit 11 as seen from a direction of arrows AA in FIG. 5. The component elements in FIG. 6 same as those in FIGS. 4 and 5 have the same signs. Referring to FIG. 6, fixation of the acceleration detecting element 24 and the mass portions 25a to 25d will be explained.

The acceleration detecting element 24 is fixed to the base part 21 and the movable part 23 by joining portions 28a, 28b in the element base portions 24c, 24d. A predetermined gap is provided between the vibration beam portions 24a, 24b and the base part 21 and the movable part 23 so that the vibration beam portions 24a, 24b may not be in contact with the base part 21 and the movable part 23 when the movable part 23 is displaced.

The mass portions 25c, 25d are fixed to the movable part 23 by joining portions 29a, 29b. The mass portions 25a, 25b (not shown) are similarly fixed to the movable part 23 by joining portions.

The operation of the sensor unit 11 is explained. When an acceleration in the +z-axis direction is applied to the sensor unit 11 (for example, see FIG. 6), a force acts on the movable part 23 in the −z-axis direction and the movable part 23 is displaced in the −z-axis direction with the joint part 22 as a fulcrum. Thereby, a force is applied to the acceleration detecting element 24 in a direction in which the element base portions 24c, 24d move away from each other along the y-axis, and tensile stress is generated in the vibration beam portions 24a, 24b. Accordingly, the vibration frequency (resonance frequency) of the vibration beam portions 24a, 24b becomes higher.

On the other hand, when an acceleration in the −z-axis direction is applied to the sensor unit 11, a force acts on the movable part 23 in the +z-axis direction and the movable part 23 is displaced in the +z-axis direction with the joint part 22 as a fulcrum. Thereby, a force is applied to the acceleration detecting element 24 in a direction in which the element base portions 24c, 24d move closer to each other along the y-axis, and compressive stress is generated in the vibration beam portions 24a, 24b. Accordingly, the resonance frequency of the vibration beam portions 24a, 24b becomes lower.

As described above, the resonance frequency of the acceleration detecting element 24 (vibration beam portions 24a, 24b) changes according to the acceleration applied to the movable part 23. Therefore, in the signal processing unit 12 to be described later, the acceleration generated in the sensor unit 11 may be calculated from the amount of change of the resonance frequency of the acceleration detecting element 24 (vibration beam portions 24a, 24b).

Note that, in the above description, the acceleration detection with respect to the single axis direction is explained, however, the acceleration sensor 1 may detect accelerations in three axis directions. For example, the acceleration sensor 1 includes sensor units 11 that detect accelerations in the x-axis direction and the y-axis direction (in other words, three sensor units 11 corresponding to the respective axes of the three axes), and thereby, may detect the accelerations in the three axis directions.

Further, in the above description, the example using the so-called double turning fork element as the acceleration detecting element 24 is explained, however, the form of the acceleration detecting element 24 is not particularly limited as long as the resonance frequency changes according to the displacement of the movable part 23.

Next, the signal processing unit 12 will be explained using the drawings.

Figure 7:
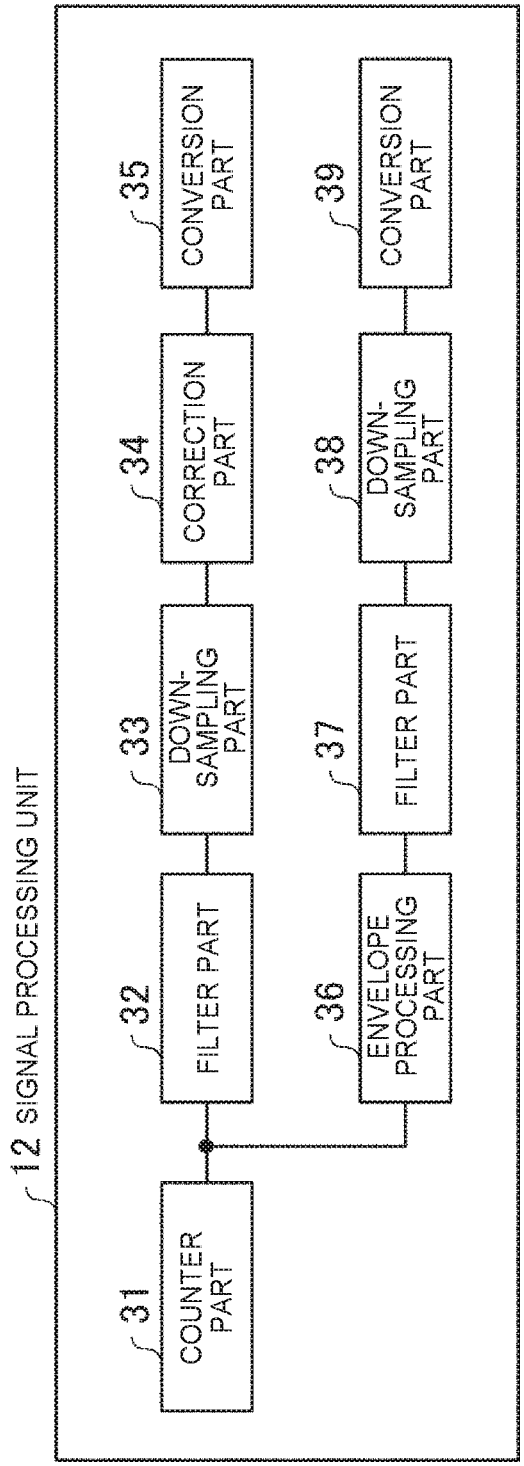
FIG. 7 shows a configuration example of a functional block of a signal processing unit.

FIG. 7 shows a configuration example of a functional block of the signal processing unit 12. As shown in FIG. 7, the signal processing unit 12 has a counter part 31, a filter part 32, a down-sampling part 33, a correction part 34, a conversion part 35, an envelope processing part 36, a filter part 37, a down-sampling part 38, and a conversion part 39. For example, the function of the signal processing unit 12 is realized by a CPU (Central Processing Unit) that executes a program stored in a memory part. Or, for example, the function of the signal processing unit 12 may be realized by a custom IC (Integrated Circuit) such as an ASIC (Application Specific Integrated Circuit).

The counter part 31 has an oscillation circuit (not shown) that excites the acceleration detecting element 24. The oscillation circuit is connected to the electrodes 27a, 27b of the sensor unit 11 and applies drive signals to the electrodes 27a, 27b of the sensor unit 11.

The drive signals (clocks) applied to the electrodes 27a, 27b of the sensor unit 11 oscillate at the resonance frequency (e.g. 120 kHz) of the acceleration detecting element 24. Note that, as described above, the resonance frequency of the acceleration detecting element 24 changes due to displacement of the movable part 23 caused by the acceleration.

The counter part 31 counts the clocks oscillating at the resonance frequency of the acceleration detecting element 24 in a predetermined cycle and measures the resonance frequency of the acceleration detecting element 24. Then, the counter part 31 calculates the amount of change of the resonance frequency of the acceleration detecting element 24. The counter part 31 outputs the calculated amount of change of the resonance frequency of the acceleration detecting element 24 to the filter part 32 and the envelope processing part 36.

The filter part 32 performs decimation of the signals output from the counter part 31 with the downstream down-sampling part 33. The filter part 32 is a filter that removes folding noise of the signals down-sampled by the down-sampling part 33. The filter part 32 is formed by e.g. a low-pass FIR (Finite Impulse Response) filter.

The down-sampling part 33 down-samples the signals passing through the filter part 32. Note that, regarding the signals output from the counter part 31 (the amount of change of the resonance frequency of the acceleration detecting element 24), the higher frequencies including the resonance frequency (e.g. 800 Hz) of the detecting element unit 80 are suppressed or removed by the filter part 32 and the down-sampling part 33.

The correction part 34 has a lookup table (not shown) showing correspondences between the amounts of change of the resonance frequency of the acceleration detecting element 24 and accelerations. The correction part 34 acquires (calculates) the acceleration corresponding to the amount of change of the resonance frequency of the acceleration detecting element 24 from the lookup table in a predetermined cycle.

Further, the correction part 34 performs correction processing of the calculated accelerations. For example, the correction part 34 performs alignment correction, offset correction, temperature drift correction, etc. of the accelerations. The correction part 34 outputs the calculated accelerations to the conversion part 35.

The conversion part 35 converts the output format of the accelerations output from the correction part 34 according to an instruction from the measurement apparatus 2. For example, the conversion part 35 converts the communication specification of the accelerations into SPI (Serial Peripheral Interface), UART (Universal Asynchronous Receiver Transmitter), or the like according to an instruction from the measurement apparatus 2. Further, the conversion part 35 converts the numerical specification of the accelerations into binary, ASCII (American standard code for information interchange), or the like according to an instruction from the measurement apparatus 2. The conversion part 35 outputs the accelerations in the converted output format to the output port 1*a*.

Note that, regarding the accelerations output from the conversion part 35, the higher frequencies including the resonance frequency of the detecting element unit 80 are suppressed by the filter part 32 and the down-sampling part 33. Therefore, from the output port 1*a*, for example, the acceleration having the low-pass characteristic shown by the waveform W1*a* shown in FIG. 2A is output.

The amounts of change of the resonance frequency of the acceleration detecting element 24 output from the counter part 31 also contain the vibration components of the detecting element unit 80. The envelope processing part 36 extracts signals of the resonance frequency components (e.g. 800 Hz) of the detecting element unit 80 from the amounts of change of the resonance frequency of the acceleration detecting element 24, and calculates an envelope of the signals. In other words, the envelope processing part 36 calculates the amplitude information in the resonance of the detecting element unit.

Figure 8:
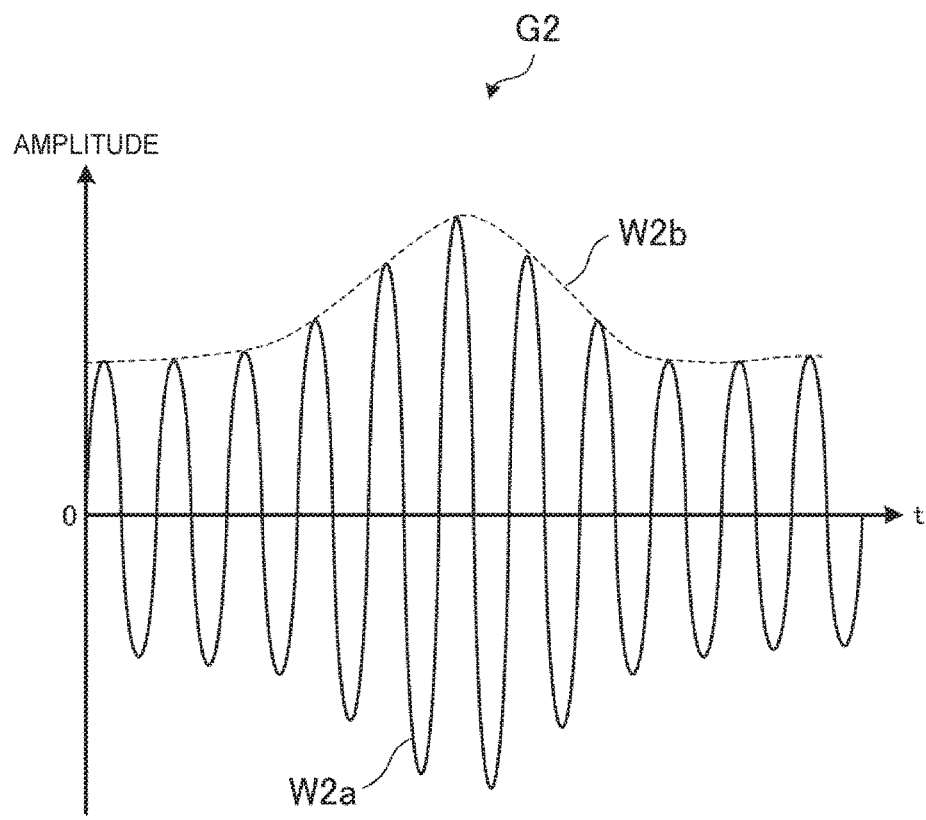
FIG. 8 shows an example of accelerations at a resonance frequency of a movable part.

FIG. 8 shows an example of amplitude information at the resonance frequency of the detecting element unit 80. The lateral axis of the graph G2 in FIG. 8 indicates time and the longitudinal axis indicates the amplitude of the signal at the resonance frequency of the detecting element unit 80.

As described above, when the vehicle 5 travels on the floor slab 4*d*, impacts are made on the floor slab 4*d* by the tires of the vehicle 5. The frequencies of the accelerations due to the impacts of the vehicle 5 vary over a wide range including the resonance frequency of the detecting element unit 80. Therefore, the signal at the resonance frequency of the detecting element unit 80 changes as shown by the waveform W2*a* of the graph G2, for example, due to the impacts of the vehicle 5. Note that the vibration frequency of the waveform W2*a* is the resonance frequency of the detecting element unit 80 (e.g. 800 Hz).

The envelope processing part 36 calculates the envelope of the waveform W2*a*. The waveform W2*b* shows the envelope of the waveform W2*a*. For example, the envelope processing part 36 calculates absolute values of the signals at the resonance frequency of the detecting element unit 80 (waveform W2*a*), performs low-pass processing, and calculates the envelope of the signals at the resonance frequency of the detecting element unit 80. Or, the envelope processing part 36 may perform Hilbert transformation on the signals at the resonance frequency of the detecting element unit 80 and calculate the envelope of the signals at the resonance frequency of the detecting element unit 80.

Returning to FIG. 7, the filter part 37 performs decimation of the envelope signals at the resonance frequency of the detecting element unit 80 output from the envelope processing part 36 with the downstream down-sampling part 38. The filter part 37 and the down-sampling part 38 are the same as the filter part 32 and the down-sampling part 33 and the explanation thereof is omitted. Note that the down-sampling part 38 down-samples the envelope signals at the resonance frequency of the detecting element unit 80 at a predetermined down-sampling rate.

The conversion part 39 converts the output format of the signals output from the down-sampling part 38 according to an instruction from the measurement apparatus 2. The conversion part 39 is the same as the conversion part 35 and the explanation thereof is omitted. The conversion part 39 outputs the amplitude information in the resonance of the detecting element unit in the converted output format to the output port 1*b*.

Note that, as described above, the envelope processing part 36 extracts the signals at the resonance frequency of the detecting element unit 80 from the amounts of change of the resonance frequency of the acceleration detecting element 24 output from the counter part 31 and calculates the envelope of the signals. Therefore, from the output port 1*b*, for example, the envelope signals at the resonance frequency "$f_r$" shown by the waveform W1*b* shown in FIG. 2A are output.

Figure 9:
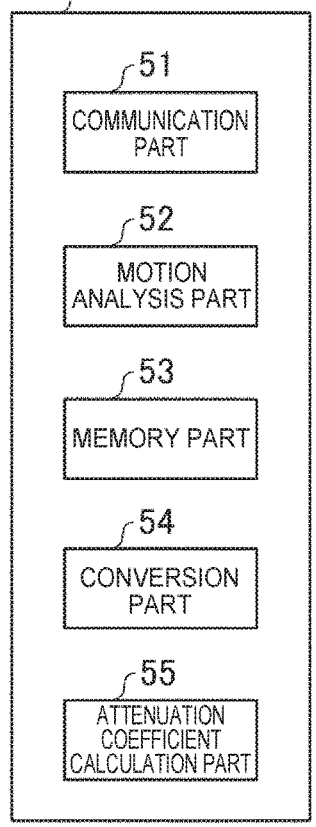
FIG. 9 shows a functional block example of a measurement apparatus.

FIG. 9 shows a functional block example of the measurement apparatus 2. As shown in FIG. 9, the measurement apparatus 2 has a communication part 51, a motion analysis part 52, a memory part 53, a conversion part 54, and an attenuation coefficient calculation part 55. The respective functional parts of the measurement apparatus 2 realize the functions thereof using a CPU that executes programs stored in the memory part, for example.

The communication part 51 receives the accelerations output from the output port 1*a* of the acceleration sensor 1. Further, the communication part 51 receives the amplitude information in the resonance of the detecting element unit output from the output port 1*b* of the acceleration sensor 1.

The motion analysis part 52 analyzes the lane and the velocity in and at which the vehicle 5 travels on the floor slab 4*d* from the accelerations received by the communication part 51.

In the memory part 53, distance relationships between the respective positions of the vehicle 5 moving on the floor slab 4*d* and the acceleration sensor 1 provided in the floor slab 4*d* are stored in advance.

The conversion part 54 converts temporal changes of the amplitude information in the resonance of the detecting element unit received by the communication part 51 into changes with respect to the distances stored in the memory part 53.

The attenuation coefficient calculation part 55 calculates the attenuation coefficient of the floor slab 4*d* based on the amplitude information in the resonance of the detecting element unit converted into the changes with respect to the distances.

As described above, the signal processing unit 12 of the acceleration sensor 1 outputs the amplitude information of the vibrations at the resonance frequency of the detecting element unit 80 using the resonance frequency of the detecting element unit 80 as the pickup frequency of the vibrations of the floor slab 4d due to the impacts of the vehicle 5. Thereby, the acceleration sensor 1 may output the signals suitable for calculation of the attenuation coefficient of the floor slab 4d.

Further, the acceleration sensor 1 may extract the vibrations due to the impacts of the vehicle 5 with higher sensitivity using the pickup frequency of the vibrations due to the impacts of the vehicle 5 as the resonance frequency of the detecting element unit 80. For example, the detecting element unit 80 amplifies external vibrations (accelerations) more highly and detect the vibrations as the Q-value at the resonance frequency is larger, and may extract the vibrations due to the impacts of the vehicle 5 with higher sensitivity.

Note that the floor slab 4d (floor slab 4) in which the acceleration sensor 1 is provided is an example of a structure. For example, the acceleration sensor 1 may be provided in another structure such as a multistory parking space.

Further, the acceleration sensor 1 may output apart or all of the three axis components of the amplitude information. Furthermore, the acceleration sensor 1 may output a part or all of the three axis components of the accelerations.

Or, the acceleration sensor 1 may include another high-Q sensor than the acceleration detecting element 24 that detects the accelerations, and may detect the vibrations of the structure from the high-Q sensor.

In the above description, the attenuation coefficient is calculated using the impacts of the vehicle 5, however, the attenuation coefficient may be calculated by generation of impacts by beating the floor slab 4d with an impact hammer.

Second Embodiment

In the first embodiment, the acceleration sensor 1 has the two output ports and outputs the accelerations and the amplitude information in the resonance of the detecting element unit from the respective output ports. In the second embodiment, the acceleration sensor 1 switches between the accelerations and the amplitude information in the resonance of the detecting element unit and outputs it from one output port.

Figure 10:
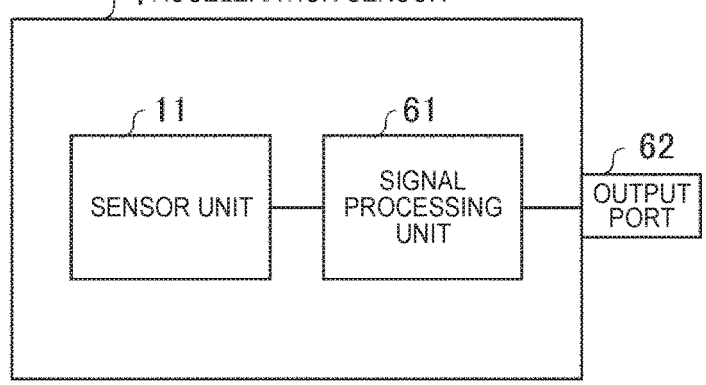
FIG. 10 shows a configuration example of a functional block of an acceleration sensor according to the second embodiment.

FIG. 10 shows a configuration example of a functional block of an acceleration sensor 1 according to the second embodiment. In FIG. 10, the same component elements as those in FIG. 3 have the same signs.

As shown in FIG. 10, the acceleration sensor 1 has a signal processing unit 61 and an output port 62. The signal processing unit 61 switches between the accelerations and the amplitude information in the resonance of the detecting element unit and outputs one of those to the output port 62.

Figure 11:
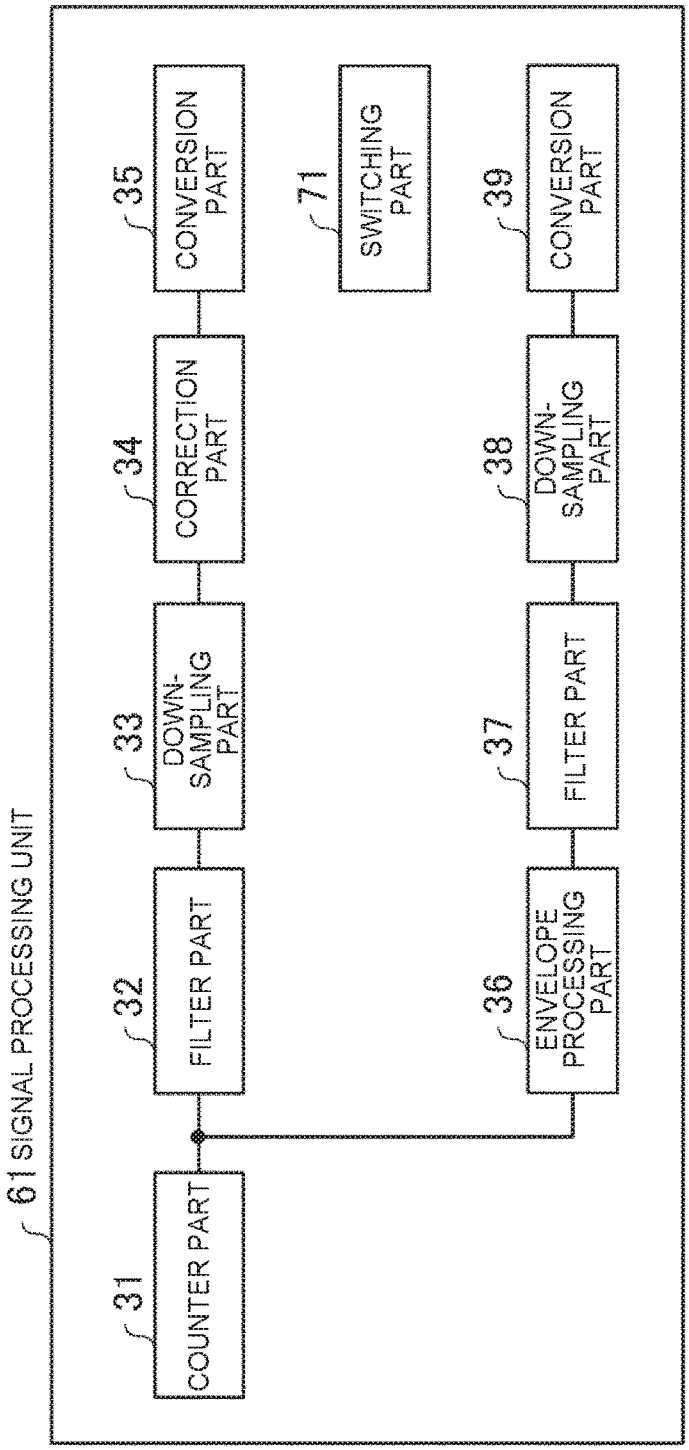
FIG. 11 shows a configuration example of a functional block of a signal processing unit.

FIG. 11 shows a configuration example of a functional block of the signal processing unit 61. In FIG. 11, the same component elements as those in FIG. 7 have the same signs. As shown in FIG. 11, the signal processing unit 61 has a switching part 71.

The switching part 71 allows one of the accelerations and the amplitude information in the resonance of the detecting element unit to be output to the output port 62 according to a command from the measurement apparatus 2. For example, when receiving a command of outputting the accelerations from the measurement apparatus 2, the switching part 71 activates the filter part 32, the down-sampling part 33, the correction part 34, and the conversion part 35 and deactivates the envelope processing part 36, the filter part 37, the down-sampling part 38, and the conversion part 39. Thereby, the accelerations are output from the conversion part 35 and the accelerations are output to the output port 62. Or, when receiving a command of outputting the amplitude information in the resonance of the detecting element unit from the measurement apparatus 2, the switching part 71 deactivates the filter part 32, the down-sampling part 33, the correction part 34, and the conversion part 35 and activates the envelope processing part 36, the filter part 37, the down-sampling part 38, and the conversion part 39. Thereby, the amplitude information in the resonance of the detecting element unit is output from the conversion part 39 and the amplitude information in the resonance of the detecting element unit is output to the output port 62.

The measurement apparatus 2 has a command output part that outputs commands to the acceleration sensor 1. For example, the command output part outputs a command of instructing output of one of the accelerations and the amplitude information in the resonance of the detecting element unit according to an operation of a user. Or, the command output part outputs a command of instructing output of one of the accelerations and the amplitude information in the resonance of the detecting element unit according to a program.

As described above, the signal processing unit 61 switches between the accelerations and the amplitude information in the resonance of the detecting element unit and outputs it from the single output port 62. Thereby, the acceleration sensor 1 may be downsized. Further, power consumption of the acceleration sensor 1 may be reduced.

Note that the acceleration sensor 1 may output a part or all of the three axis components of the amplitude information and the three axis components of the accelerations.

Further, the command output part of the measurement apparatus 2 may output a command of instructing output of both the accelerations and the amplitude information in the resonance of the detecting element unit. When receiving the command, the acceleration sensor 1 alternately outputs the accelerations and the amplitude information in the resonance of the detecting element unit from the output port 62.

As above, the invention is explained using the embodiments. The functional configurations of the acceleration sensor 1 are classified according to major processing details to facilitate understanding of the configuration of the acceleration sensor 1. The invention of the application is not limited by the method of classification and names of the component elements. The configuration of the acceleration sensor 1 may be classified into more component elements according to the processing details. Or, a classification such that one component element executes more pieces of processing may be performed. The processing of each component element may be executed by a single piece hardware or a plurality of pieces of hardware.

The technical scope of the invention is not limited to that described in the embodiments. As will be understood by the person skilled in the art, various changes or improvements may be made to the embodiments. Further, it is clear from the description of the appended claims that the technical scope of the invention may include the embodiments with the changes and improvements.

The entire disclosure of Japanese Patent Application No. 2015-256338 filed Dec. 28, 2015 is expressly incorporated by reference herein.

What is claimed is:

1. A physical quantity detection apparatus comprising:
   a detecting element unit having
   a detection part having a base part, a movable part coupled to the base part via a joint part, and a vibrator provided over the base part and the movable part, and
   a supporting part including a fixing portion to be fixed to a base for supporting the base part; and
   a processing unit that extracts vibration response signals at a resonance frequency of the detecting element unit from output of the vibrator.

2. The physical quantity detection apparatus according to claim 1, wherein the processing unit outputs amplitude information of the vibration response signals.

3. The physical quantity detection apparatus according to claim 2, wherein the processing unit calculates physical quantity signals from output of the vibrator.

4. The physical quantity detection apparatus according to claim 3, wherein the processing unit outputs one of the amplitude information and the physical quantity signals according to a command.

5. The physical quantity detection apparatus according to claim 3, wherein, in the physical quantity signals, resonance frequency components of the detecting element unit are suppressed or removed.

6. The physical quantity detection apparatus according to claim 2, wherein the amplitude information is envelope signals.

7. A measurement system comprising:
   a physical quantity detection apparatus having a detecting element unit having a detection part having a base part, a movable part coupled to the base part via a joint part, and a vibrator provided over the base part and the movable part, and a supporting part including a fixing portion to be fixed to a base for supporting the base part, and a processing unit that extracts vibration response signals at a resonance frequency of the detecting element unit from output of the vibrator; and
   a measurement apparatus that calculates attenuation characteristics of a structure based on the vibration response signals extracted by the physical quantity detection apparatus.

8. A measurement apparatus comprising a command output part that, to a physical quantity detection apparatus having a detecting element unit having a detection part having a base part, a movable part coupled to the base part via a joint part, and a vibrator provided over the base part and the movable part, and a supporting part including a fixing portion to be fixed to a base for supporting the base part, and a processing unit that extracts vibration response signals at a resonance frequency of the detecting element unit from output of the vibrator, outputs a command of instructing output one or both of amplitude information of the vibration response signals and physical quantity signals calculated from output of the vibrator.

* * * * *